United States Patent
Takagi et al.

(10) Patent No.: US 8,249,751 B2
(45) Date of Patent: Aug. 21, 2012

(54) POWER SAVING AIR-CONDITIONING SYSTEM

(75) Inventors: Masahiko Takagi, Tokyo (JP); Masanobu Baba, Tokyo (JP); Norikazu Ishikawa, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 431 days.

(21) Appl. No.: 12/510,399

(22) Filed: Jul. 28, 2009

(65) Prior Publication Data

US 2010/0174414 A1 Jul. 8, 2010

(30) Foreign Application Priority Data

Jan. 7, 2009 (JP) ................................. 2009-001585

(51) Int. Cl.
*F24F 11/02* (2006.01)
(52) U.S. Cl. .................... 700/278; 165/205; 165/237
(58) Field of Classification Search .......... 700/276–278; 165/200, 201, 205, 208–211, 237, 243, 244, 165/253, 287–291; 62/161–164, 440–442
See application file for complete search history.

(56) References Cited

U.S. PATENT DOCUMENTS

| | | | | |
|---|---|---|---|---|
| 5,050,396 A | * | 9/1991 | Ohkoshi et al. | 62/160 |
| 5,388,422 A | * | 2/1995 | Hayashida et al. | 62/211 |
| 5,899,807 A | * | 5/1999 | Kim et al. | 454/229 |
| 6,349,883 B1 | * | 2/2002 | Simmons et al. | 236/46 R |
| 6,644,050 B2 | * | 11/2003 | Shim | 62/175 |
| 6,909,379 B2 | * | 6/2005 | Niizato | 340/12.22 |
| 7,185,504 B2 | * | 3/2007 | Kasai et al. | 62/186 |
| 7,661,603 B2 | * | 2/2010 | Yoon et al. | 236/51 |
| 2004/0255601 A1 | * | 12/2004 | Kwon et al. | 62/157 |
| 2005/0044861 A1 | * | 3/2005 | Cho, II | 62/81 |
| 2006/0059928 A1 | * | 3/2006 | Fujiyoshi et al. | 62/176.6 |
| 2006/0123811 A1 | * | 6/2006 | Ha et al. | 62/175 |
| 2006/0287774 A1 | * | 12/2006 | Yoon et al. | 700/276 |
| 2008/0306632 A1 | * | 12/2008 | Miki et al. | 700/276 |
| 2010/0010680 A1 | * | 1/2010 | Nishino et al. | 700/282 |

FOREIGN PATENT DOCUMENTS

| | | |
|---|---|---|
| CN | 1514923 A | 7/2004 |
| EP | 676595 A1 * | 10/1995 |
| JP | 03001031 A * | 1/1991 |

(Continued)

OTHER PUBLICATIONS

Partial translation of JP 03-001031 A.*

(Continued)

*Primary Examiner* — M.N. Von Buhr
(74) *Attorney, Agent, or Firm* — Buchanan Ingersoll & Rooney PC (57) ABSTRACT

Control units for three indoor units of air conditioners installed in a same indoor space are connected by a communication line. Each of the control units can grasp the detection information of the human detection sensor, preset temperature information of the remote controller, inlet temperature information of the inlet temperature sensor of all of the other air conditioners in the same space. On the basis of the above-mentioned information, each of the control units calculates an air-conditioning load of each of the air-conditioning target spaces and the air-conditioning load of an entire air-conditioning space on the basis of these air-conditioning target spaces in the same manner. A compressor is driven and controlled on the basis of a calculation result thereof to perform a power-saving operation of the entire air-conditioning space.

21 Claims, 3 Drawing Sheets

1: INDOOR UNIT
2: EXTERIOR
3: INDOOR PANEL
4: INLET OPENING
5: OUTLET OPENING
6: CENTRIFUGAL FAN
7: HEAT EXCHANGER
8: BELL MOUTH
9: INLET GRILL
10: FILTER
11: OUTLET AIR DUCT
12: VANE
13: INLET AIR
14: OUTLET AIR
15: INLET TEMPERATURE SENSOR

FOREIGN PATENT DOCUMENTS

| | | | | |
|---|---|---|---|---|
| JP | 03263540 | A | * | 11/1991 |
| JP | 05256494 | A | * | 10/1993 |
| JP | 06213495 | A | * | 8/1994 |
| JP | 2002130774 | A | * | 5/2002 |
| JP | 2003161503 | A | * | 6/2003 |
| JP | 2008-101880 | A | | 5/2008 |
| JP | 2008157548 | A | * | 7/2008 |

OTHER PUBLICATIONS

Chinese Office Action issued Dec. 21, 2011 by the Chinese Patent Office in corresponding Chinese Application No. 200910165533.4, and a partial English translation thereof (11 pages).

* cited by examiner

FIG. 1

20: COMMUNICATION LINE

1: INDOOR UNIT
2: EXTERIOR
3: INDOOR PANEL
4: INLET OPENING
5: OUTLET OPENING
6: CENTRIFUGAL FAN
7: HEAT EXCHANGER
8: BELL MOUTH
9: INLET GRILL
10: FILTER
11: OUTLET AIR DUCT
12: VANE
13: INLET AIR
14: OUTLET AIR
15: INLET TEMPERATURE SENSOR

FIG. 4

16 HUMAN DETECTION SENSOR

FIG. 5

A: AIR CONDITIONER

FIG. 6

POWER SAVING AIR-CONDITIONING SYSTEM

BACKGROUND OF THE INVENTION

1. Field of the Invention

The present invention relates to an air-conditioning system for controlling a plurality of air conditioners arranged in an indoor space and having a human detection sensor on an indoor unit to detect the human motion.

2. Description of the Related Art

An air conditioner of this kind has been developed, wherein the main body is attached with an infrared sensor for detecting the human motion (hereinafter referred to as a human detection sensor) and the air conditioner is capable of power-saving operation by turning off the operation or shifting the preset temperature to the power-saving side upon detection by this human detection sensor whether any human is present (for example, see Japanese Unexamined Patent Application Publication No. 2008-101880 (page 1, FIG. 1)).

As described above, with the use of the human detection sensor, the operation mode of the air conditioner can be automatically controlled according to whether any human is present in the room, and the air-conditioning operation that is not only comfortable for the user but also efficient can be achieved.

For example, when an indoor space is air-conditioned in a building having a relatively large indoor space such as a store, a restaurant, and an office, a single indoor space is usually air-conditioned using multiple indoor units in many cases.

SUMMARY OF THE INVENTION

A conventional air conditioner has a problem in that an indoor unit detects whether any human is present in each of air-conditioning areas and independently air-conditions each of the air-conditioning areas, and for example when many people are concentrated in a certain area of the room, the air conditioner in an area with no people operates under a power-saving operation mode, so that the air-conditioning capability becomes insufficient for the entire indoor space.

If a shift amount to a power-saving operation is made uniformly small to prevent such a problem as described above, it is difficult to sufficiently obtain a power-saving effect.

In addition, the conventional air conditioner has a problem in that since each of the air conditioners operates independently, multiple air conditioners simultaneously perform defrosting operation during a heating operation, so that temporarily the air-conditioning capability markedly decreases and markedly lowers the level of comfort in the room.

The present invention has been made to solve such problems, and it is an object of the present invention to provide an air-conditioning system capable of power-saving operation by making a plurality of air conditioners arranged in the same indoor space share human detection information and operation information to grasp the air-conditioning load of each of the air-conditioning target spaces and the air-conditioning load of the entire indoor space.

An air-conditioning system according to the present invention has a plurality of air conditioners including indoor units installed in the same indoor space. The air conditioner comprises the indoor unit arranged with a human detection sensor for detecting the human motion in an air-conditioning target space and an inlet temperature sensor for detecting an inlet temperature, a compressor for controlling an efficiency of heat exchange of a heat exchanger installed in the indoor unit, a remote controller for setting start and stop of operation and a preset temperature, and a control unit for driving and controlling the compressor, on the basis of information on the starting and stopping of the operation and the preset temperature set by the remote controller and detection information obtained by the inlet temperature sensor and the human detection sensor. Control units of the plurality of air conditioners are connected via wiring or wirelessly. Each of the control units can grasp the detection information of the human detection sensor, setting temperature information set by the remote controller, inlet temperature information of the inlet temperature sensors of all the air-conditioners in the same space. On the basis of the above-mentioned information, each of the control units calculates an air-conditioning load in each of the air-conditioning target spaces and an air-conditioning load in an entire air-conditioning space on the basis of the air-conditioning target spaces in the same manner, so as to drive and control each of the compressors on the basis of a calculation result thereof to perform a power-saving operation for the entire air-conditioning space.

According to the above described air-conditioning system, an energy-saving operation can be realized efficiently.

DESCRIPTION OF THE PREFERRED EMBODIMENTS

First Embodiment

Figure 1:
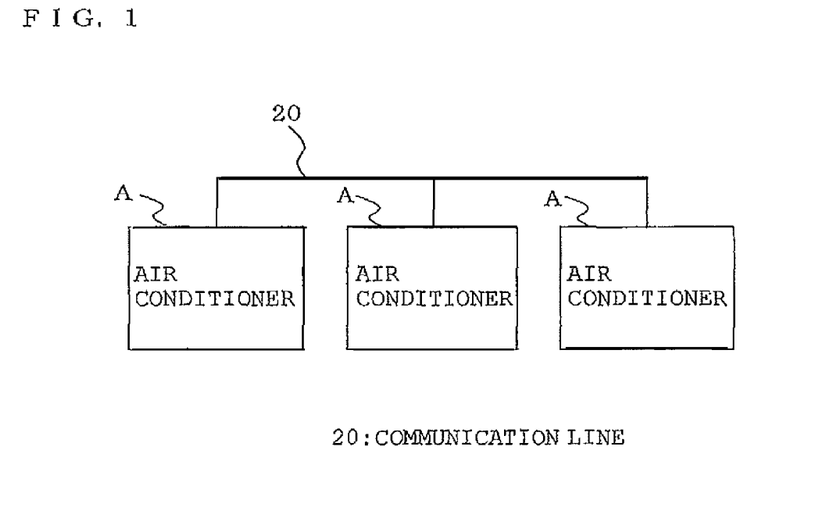
FIG. 1 is a block diagram of an air-conditioning system according to the first embodiment of the present invention.
Figure 2:
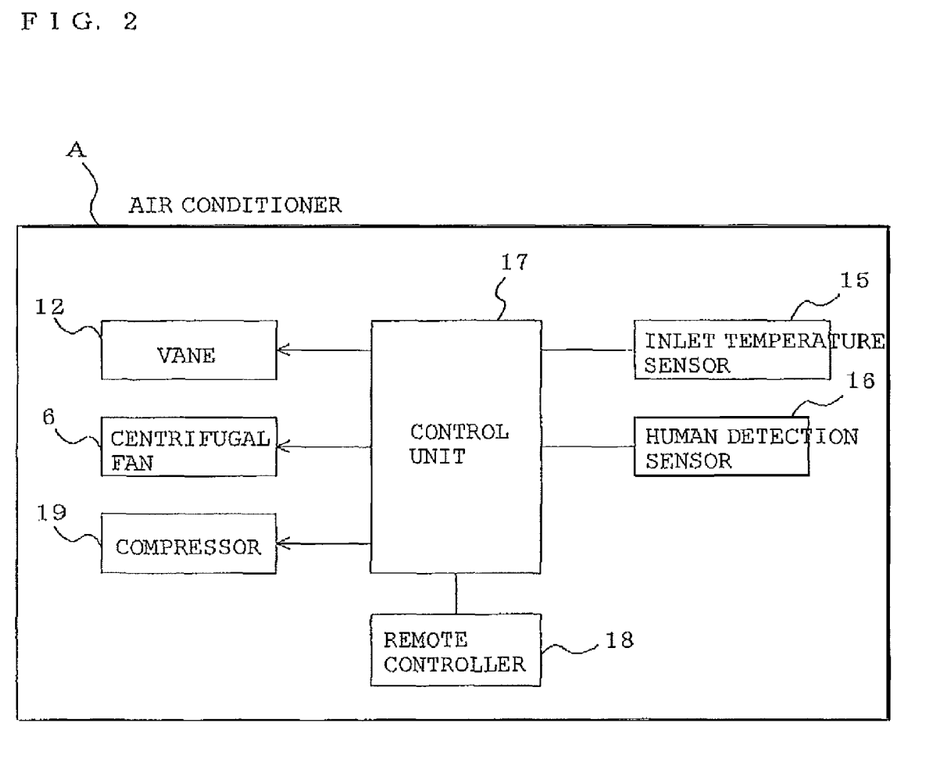
FIG. 2 is a block diagram showing an internal configuration of an air conditioner of the air-conditioning system.
Figure 3:
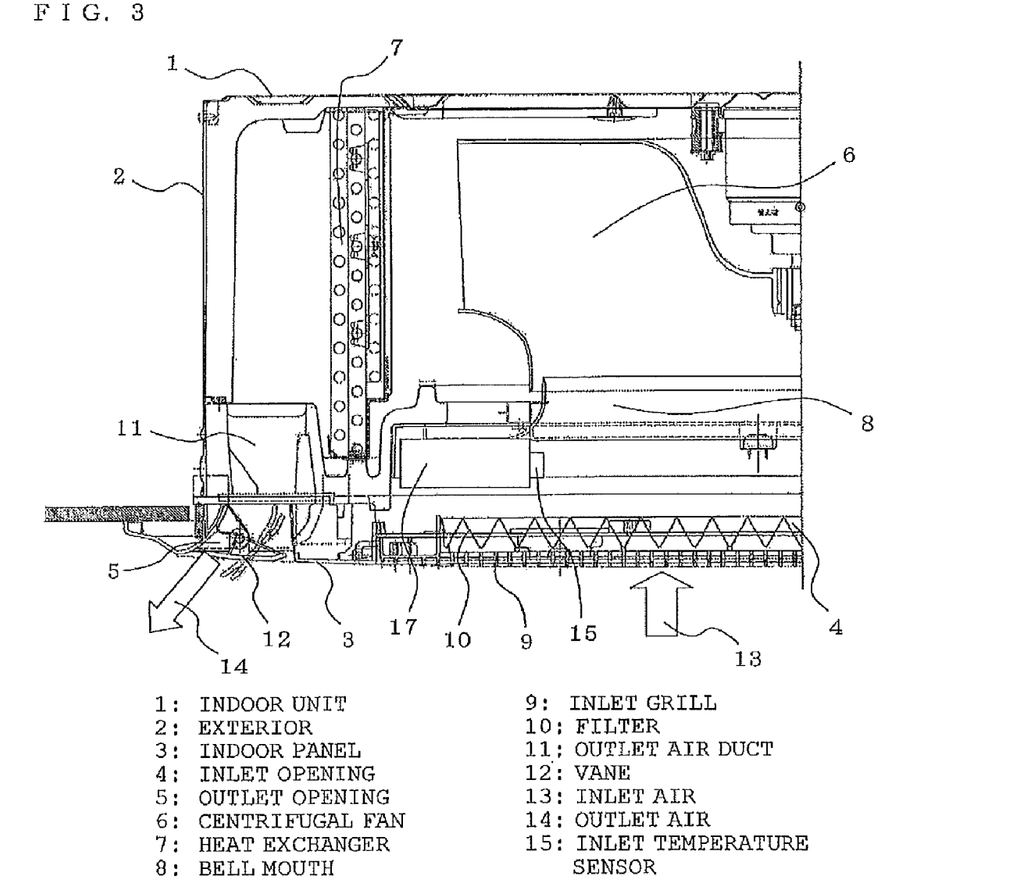
FIG. 3 is a cross sectional diagram showing the configuration of half of the entire indoor unit of the air conditioner of the air-conditioning system.
Figure 4:
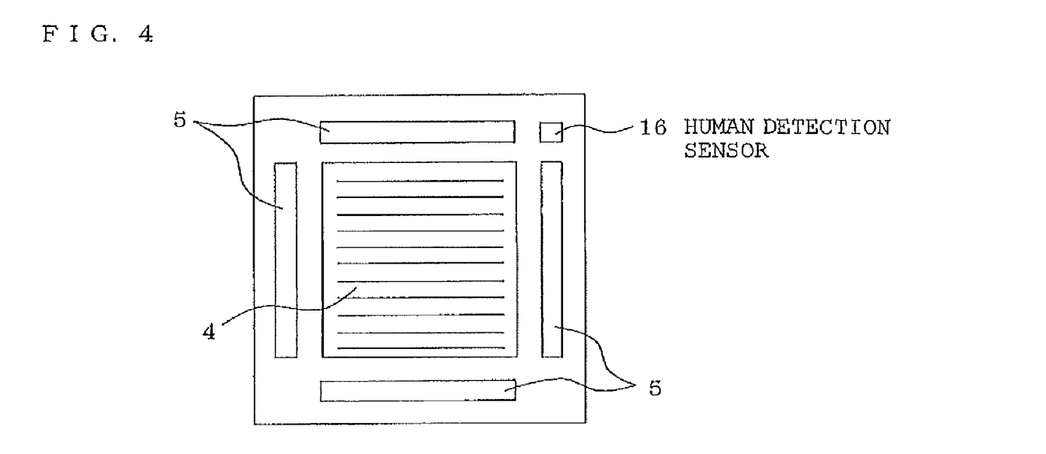
FIG. 4 is a front elevational view showing an indoor panel of the air conditioner of the air-conditioning system.

FIG. 1 is a block diagram of an air-conditioning system according to the first embodiment of the present invention. FIG. 2 is a block diagram showing the internal configuration of the air conditioner of the air-conditioning system. FIG. 3 is a cross sectional diagram showing the configuration of half of the entire indoor unit of the air conditioner of the air-conditioning system. FIG. 4 is a front elevational view showing an indoor panel of the air conditioner of the air-conditioning system.

An indoor unit 1 of an air conditioner A of the air-conditioning system according to the present embodiment 1 is a ceiling-embedded type embedded in the ceiling of the room, but can also be applied to an indoor unit of other embodiments.

As shown in FIG. 3, the indoor unit 1 has a rectangular box-shaped outer shell 2 embedded on the upper side of a ceiling 50 and a rectangular planar indoor panel 3 attached to the lower end opening of the outer shell 2 from the indoor side.

In addition, as shown in FIG. 4, an inlet opening 4 is formed at the center of the indoor panel 3. Four outlet openings 5 are formed on the outer periphery of the inlet opening 4.

A centrifugal fan 6 is arranged above the inlet opening 4 in the outer shell 2. A heat exchanger 7 is arranged on the outer periphery of the centrifugal fan 6 so as to surround the centrifugal fan 6.

In addition, a bell mouth 8 is arranged between the centrifugal fan 6 and the inlet opening 4. The inlet opening 4 is attached with an inlet grill 9 and a filter 10.

An outlet air duct 11 is formed above the outlet opening 5, and a vane 12 is arranged below the outlet opening 5 to adjust the outlet direction.

With the configuration as described above, through the rotation of the centrifugal fan 6, the inlet air 13 passes through the inlet opening 3 and the bell mouth 8, and after heat-exchanged by the heat-exchanger 7, passes through the outlet air duct 11, and the air direction being adjusted by the vane 12, and blown out as outlet air 14 from the outlet openings 5. Therefore, an air volume can be adjusted by controlling the number of rotations of the centrifugal fan 6, and an air flow direction can be adjusted by controlling the angle of the vane 12.

On the other hand, at the inlet opening 4, an inlet temperature sensor 15 is arranged to measure the inlet air temperature, and at one corner of the surface side (indoor side) of the indoor panel 3, a human detection sensor 16 is arranged that can detect the human motion in the air-conditioning target space (see FIG. 4). The human detection sensor 16 herein uses infrared, and therefore can also measure the radiation temperature of the walls and the floor of the air-conditioning target space.

Detection information of the inlet temperature sensor 15 and a human detection sensor 16 is input to a control unit 17 arranged between the inlet opening 3 and the bell mouth 8. On the basis of the detection information thereof and the preset temperature of a remote controller 18, the control unit 17 drives and controls the centrifugal fan 6, the vane 12, and the compressor 19 to control operation, stop, power-saving operation, air volume, and air flow direction.

In the first embodiment of the present invention, for example, three sets of air conditioners A as described above are connected in the same indoor space via a communication line 20 as illustrated in FIG. 1.

As described above, by connecting the control units 17 of, e.g., three sets of air conditioners A in the same indoor space via the communication line 20, the control unit 17 of each of the air conditioners A can also grasp the human detection information, the preset temperature, the inlet temperature, the operation status information, and the like of the other two air conditioners A in the same indoor space.

On the basis of the human detection information, the preset temperature, the inlet temperature, the operation status information, and the like of the self and the other air conditioners A, the control unit 17 of each of the air conditioners A judges the load conditions of the entire air-conditioning space in the same manner, and operates in accordance with the result thereof so as to achieve both comfort and power-saving operation of the entire air-conditioning space.

An air-conditioning target space in the same indoor space is determined for the control unit 17 of each of the air conditioners A. An air-conditioning load of the air-conditioning target space is calculated by a "preset temperature" by the remote controller 18, "inlet temperature (indoor)" detected by the inlet temperature sensor 15, and "number of people detected by the human detection sensor" detected by the human detection sensor 16.

First, it is judged that the larger the difference between the preset temperature and the inlet temperature, the higher the air-conditioning load. In addition to the above, for example, during cooling operation, the more people there are, the higher the load becomes, whereas during heating operation, the fewer people, the higher the air-conditioning load.

Then, the air-conditioning load of the air-conditioning target space is calculated by compositive judgment using information regarding the "preset temperature", "inlet temperature (indoor)", and "number of people detected by the human detection sensor."

In addition, the control unit 17 of each of the air conditioners A calculates the air-conditioning load of the entire air-conditioning space in the same indoor space from the sum total of the air-conditioning load of the air-conditioning target space of each of the air conditioners A.

When it is judged that the air-conditioning load of each of the air-conditioning target spaces is high, the control unit 17 specifically performs control to increase the number of rotations of the compressor 19 so as to increase the air-conditioning capability to lower the air-conditioning load. Then, the temperature of the heat exchanger 7 increases during heating operation and decreases during cooling operation to lower the air-conditioning load.

When the control unit 17 performs control to increase the number of rotations of the centrifugal fan 6 of the indoor unit 1, the air volume passing through the heat exchanger 7 increases, so that the air-conditioning capability increases and the air-conditioning load decreases.

Therefore, when the number of rotations of the compressor 19 and the centrifugal fan 6 is decreased, the air-conditioning performance decreases.

Next, the firstly, detailed descriptions will be given to a case where, in the air-conditioning system according to the first embodiment of the present invention, the control unit 17 of each of the air conditioners A derives the air-conditioning load of each of the air-conditioning target spaces in the same indoor space and that of the entire air-conditioning space, and performs operation in such a manner as to maintain both comfort and power-saving operation for the entire air-conditioning space.

Meaning of grasping the air-conditioning load of each of the air-conditioning target spaces will be explained.

As a first example, the air conditioner has the following characteristics.

a) There exists a minimum capability in each of the models, which cannot be lowered further. Accordingly, in a case where it is necessary to lower the capability, operation and stop are repeated.

b) The efficiency at the start of operation is worse than normal operation (the efficiency becomes approximately one half).

Where, efficiency=air-conditioning capability/power consumption.

Considering the above, for example, if in the indoor space installed with four air conditioners having the minimum capability of 5 kW, the four air conditioners operate at the minimum performance, the total power consumption is 20 kW. Accordingly, in a case when the air-conditioning load of the entire indoor space is 15 kW,

[Capability of Air Conditioners]>[Air-conditioning Load].

Therefore, all of the four air conditioners repeat [Stop because of overcooling]—[operation in response to a temperature rise in the room due to stop].

As described above, when the air conditioner A repeats stop and operation, an inefficient operation at start up continues.

In the first embodiment of the present invention, when the air-conditioning load in the entire indoor space is judged to be 15 kW, one air conditioner A is stopped, and the three remaining air conditioners A operate at 15 kW, thus reducing the loss occurring due to inefficient stop to achieve more power-saving than before.

As a second example, the air conditioners A has a different efficiency depending on the model (for example, a high efficiency deluxe model and an ordinary general model), and the efficiency differs even with the same model (the number of rotations of the compressor) according to the capability (difference in operation efficiency arising from the difference in operating point).

In a case where multiple different air conditioners A are installed in the same indoor space, conventionally each of the air conditioners A independently operates in accordance with the corresponding air-conditioning load. In the first embodiment of the present invention, as long as the air-conditioning load of the entire room is satisfied, an efficient air conditioner is preferentially operated, and the air conditioner is used at an efficient operating point, so that power-saving operation is possible to output a certain air-conditioning capability for the entire indoor space.

The above can be realized only after the air-conditioning load of the air-conditioning target space and that of the entire air-conditioning space in the same indoor space are clearly known.

Next, the meaning of power-saving operation and comfort will be described.

a) Power-Saving Operation

In the air conditioning system according to the first embodiment of the present invention, the control unit 17 of each of the air conditioners A makes an efficient air conditioner A to preferentially operate, so that small power dissipation, that is, power-saving operation is possible with the same air-conditioning load as before in the entire air-conditioning space.

b) Comfort

Comfort does not mean "more comfortable than before." Under the maximum power-saving operation, the output varies depending on the air conditioner, and therefore it is expected that the temperature in the room may become non-uniform and comfort may deteriorate.

Therefore, the air conditioners operate considering not only power-saving but also level of comfort.

That is, for example, in the air-conditioning target space in which there are no people, the maximum power-saving operation is performed, whereas in the air-conditioning target space in which there are people, the power-saving operation is performed within a range in which the difference (=temperature non-uniformity) of the inlet temperatures (indoor) of each air-conditioning spaces does not become more than a certain level.

In this way, operation can be performed so as to maintain both power-saving operation and of comfort.

Secondly, the power-saving operation such as a stop of operation and shifting the preset temperature to the power-saving side will be described when the air-conditioning load has a margin for the entire indoor space and the air-conditioning target space.

Here, whether there is a margin of both the air-conditioning load of the entire indoor space the air-conditioning target space is judged on the basis of the difference between the preset temperature and the inlet temperature (indoor) in the air-conditioning target space. If the inlet temperature comes closer to the preset temperature, the air-conditioning load becomes smaller, there is a margin for the air-conditioning load.

Furthermore, the number of people detected by the human detection sensor 16 is added as another factor. For example, during cooling operation, the more people, the larger the load, whereas during heating operation, the less people, the larger the air-conditioning load. Therefore, during cooling operation, the less people, the larger margin of the air-conditioning load, whereas during heating operation, the more people, the larger margin of the air-conditioning load.

Whether the air-conditioning load has a margin for the entire indoor space is judged on the basis of the sum total of the air-conditioning load of each of the air-conditioning target spaces.

Next, a case will be described where the air conditioning system performs the power-saving operation by shifting the preset temperature to the power-saving side when not only the air-conditioning load of the entire indoor space but also the air-conditioning load of the air-conditioning target space have a margin.

Generally, the output of the air conditioner is adjusted on the basis of "the difference between the preset temperature and the inlet temperature." During cooling operation, if "the inlet temperature—the preset temperature" becomes smaller, the output is made to be smaller, and therefore, when the preset temperature is shifted to higher side, the power-saving operation is performed (the same can be achieved by shifting the inlet temperature to lower side).

On the other hand, during heating operation, if "the preset temperature—the inlet temperature" becomes smaller, the output is made to be smaller, and therefore, when the preset temperature is shifted to lower side, the power-saving operation is performed (the same can be achieved by shifting the inlet temperature to higher side).

That is, this results in a situation where it is not necessary to perform heating or cooling operation any more, and therefore, it becomes the power-saving operation.

Here, shifting the preset temperature means that even when the preset temperature set by the user during cooling operation is 23 degrees Celsius, the control unit 17 makes an adjustment and recognizes that the preset temperature is, e.g., 24 degrees Celsius, so as to perform the power-saving operation by one degree Celsius.

In addition, shifting the inlet temperature means that the control unit 17 makes an adjustment with respect to the inlet temperature actually detected, and for example, when the actual inlet temperature is 23 degrees Celsius during cooling operation, the control unit 17 makes an adjustment to the inlet temperature and judges that it is 22 degrees Celsius, so as to perform the power-saving operation by one degrees Celsius.

Thirdly, the power-saving operation such as a stop operation and shifting the preset temperature to the power-saving side will be described in some of the air-conditioning target spaces, in which the number of people is small in the same indoor space.

Here, whether the number of people in the air-conditioning target space is small is determined as follows. For example, in a case where five sets of air conditioners are arranged in the same indoor space, there are five air-conditioning target spaces, and the number of people in each of these five air-conditioning target spaces are compared to determine whether the number of people is small. The power-saving operation is performed by stopping the operation, shifting the preset temperature to the power-saving side, or the like for the air-conditioning target space in which the number of people is small.

Fourthly, the power-saving operation will be described such as varying the amount of shift to the power-saving side in accordance with the number of people in the room and the air-conditioning load calculated in each of the air-conditioning target spaces in the same indoor space.

In the air-conditioning target space in which the air-conditioning load is small, the operation is performed while the shift amount to the power-saving side is made larger, whereas in the air-conditioning target space in which the air-conditioning load is high or in the air-conditioning target space in which there are many people, the operation is performed while the shift amount to the power-saving side is made smaller considering the comfort.

Herein, shifting to the power-saving side means shifting the preset temperature or the inlet temperature to the power-saving side.

Fifthly, descriptions will be given to a case, in which multiple air conditioners A are prohibited from simultaneously performing defrosting operation in the same indoor space, and the defrosting operation is performed one by one from the air-conditioning target space having small air-conditioning load calculated from the human detection information and temperature information in each of the air conditioners A.

This is because the heating operation cannot be performed during the defrosting operation, and when multiple air conditioners A in the same indoor space simultaneously perform the defrosting operation, the air-conditioning capability markedly decreases, and the room temperature decreases, so that the comfort in the room deteriorates.

Therefore, the defrosting operation is performed one by one, so that the air-conditioning capability in the indoor space can be prevented from markedly decreasing.

The reason why the order starts from the air-conditioning target space in which the air-conditioning load is low is that, under the environment where the external temperature is low and the air-conditioning load is high, the air conditioner A is considered to go into the defrosting operation while the room temperature has not sufficiently risen yet, and therefore in the air-conditioning target space in which the air-conditioning load is high, the user's satisfaction does not deteriorate if the air conditioner A is operated for as longer as possible so that the defrosting operation is performed after the room temperature has risen.

Here, the above-described example is the defrosting operation when the air-conditioning load is high and the room temperature has not risen, but this relationship is not reversed even when the room temperature comes close to the preset temperature.

In a case where there is no choice but to perform the defrosting operation when the room temperature in the room has not risen, the user's discomfort is considered to be less if the air-conditioning target space in which the load is low is prioritized over the air-conditioning space in which the load is high.

Sixthly, descriptions will be given to a case, in which multiple air conditioners A in the same indoor space are prohibited from simultaneously performing the defrosting operation, and the air conditioners A perform the defrosting operation one by one from the air-conditioning target space in which the number of people is small from the human detection information of each of the air conditioners A.

Also in this case, the heating operation cannot be performed during the defrosting operation, so that if the multiple air conditioners A in the same indoor space simultaneously perform the defrosting operation, the air-conditioning capability markedly decreases, and the room temperature decreases, so that the comfort in the room deteriorates.

Therefore, the air conditioners A perform the defrosting operation one by one so that the air-conditioning capability in the indoor space can be prevented from markedly decreasing.

The reason why the order starts from the air-conditioning target space in which the number of people is small is that the user's satisfaction does not deteriorate if the operation in the air-conditioning target space in which the number of people is large is performed for as long as possible so that the defrosting operation is performed after the room temperature has risen.

Seventhly, descriptions will be given to a case, in which when the air-conditioning load is high and the capability tends to be insufficient only in some of the air-conditioning target spaces in the same indoor space, the air conditioners A in the other air-conditioning target spaces operates in such a manner as to blow air toward the air-conditioning space in which the air-conditioning load is high upon adjusting the air flow direction and air volume.

The purpose of the operation in this case is to "compensate for the lack of capability" in the air-conditioning target space in which the air-conditioning load is high and the capability tends to be insufficient, and to "cause the air to reach the air-conditioning target space in which the capability is insufficient by improving the reachability of the air."

Therefore, for example, a table for the number of rotations of the centrifugal fan 6 is prepared in several steps, and control is performed such that the number of rotations is increased stepwise until the lack of capability in a certain air-conditioning target space is solved.

It should be noted that there exists the uppermost limit of the number of rotations of the centrifugal fan 6, and therefore, the air volume cannot be increased more than the uppermost limit.

Second Embodiment

Figure 5:
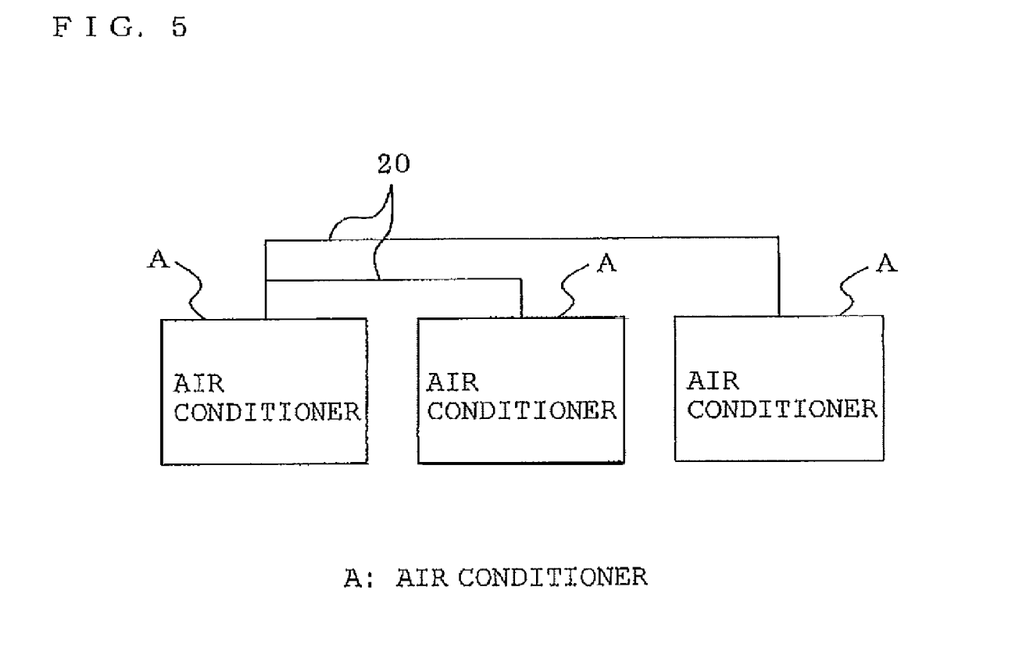
FIG. 5 is a block diagram of the air-conditioning system according to the second embodiment of the present invention.

FIG. 5 is a block diagram of an air-conditioning system according to the second embodiment of the present invention.

In the above-described first embodiment, the control units 17 of multiple air conditioners A independently operate on the basis of all of the detection information in the same indoor space. In the second embodiment, as shown in FIG. 5, the control units 17 of the air conditioners A are connected via the communication line 20 in such a manner that one of the three air conditioners A installed in the same indoor space serves as a parent device.

Therefore, the control unit 17 of the air conditioner A serving as the parent device can grasp the detection information of the human detection sensor 16 of the other two air-conditioners A, the preset temperature information of the remote controller 18, and the inlet temperature information of the inlet temperature sensor 15, and on the basis of the above-mentioned information calculates the air-conditioning load of each of the air-conditioning target spaces and the air-conditioning load in the entire air-conditioning space on the basis of the air-conditioning loads of the these air-conditioning target spaces. Then, the control unit 17 of the air conditioner A serving as the parent device outputs control instructions to the control units 17 of the other two air conditioners A, so that the above-described first to seventh operations can be performed in the same manner as the first embodiment.

Third Embodiment

Figure 6:
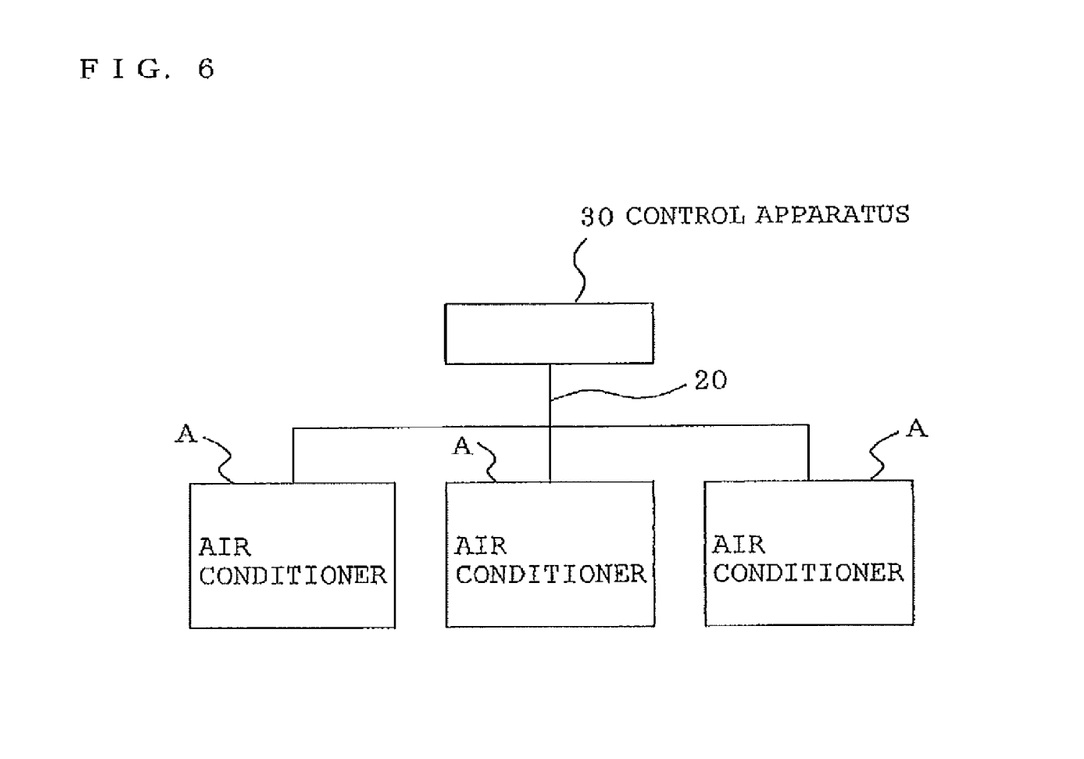
FIG. 6 is a block diagram of the air-conditioning system according to the third embodiment of the present invention.

FIG. 6 is a block diagram of an air-conditioning system according to the third embodiment of the present invention.

In the third embodiment, as shown in FIG. 6, a control apparatus 30, which is different from the three air conditioners A installed in the same indoor space, is connected to the control units 17 of all of the air conditioners A and the communication line 20 so as to serve as a host.

Therefore, the control apparatus 30 can grasp the detection information of the human detection sensor 16 of the three air conditioners A, the preset temperature information of the remote controller 18, and the inlet temperature information of the inlet temperature sensors 15, and on the basis of the above-mentioned information, calculates the air-conditioning load of each of the air-conditioning target spaces and the air-conditioning load of the entire air-conditioning space based on the air-conditioning loads of these air-conditioning target spaces. The control apparatus 30 outputs control instructions to the control units 17 of the three air conditioners A to perform the above-described first to seventh operations in the same manner as the first embodiment.

In both of the above-described first and second embodiments, the control units 17 of the three air conditioners A are by communication line 20, and in the above-described third embodiment, the control apparatus 30 is connected to the control units 17 of the three air conditioners A by communication line 20, but they may be connected wirelessly instead of the communication line 20.

What is claimed is:

1. An air-conditioning system having a plurality of air conditioners: each air conditioner comprising;
   an indoor unit arranged with a human detection sensor for detecting a human motion in an air-conditioning target space and an inlet temperature sensor for detecting an inlet temperature of the indoor unit;
   a compressor controlling an efficiency of heat exchange of a heat exchanger installed in the indoor unit;
   a remote controller for starting and stopping an operation of the air conditioner and setting a preset temperature; and
   a control unit for driving and controlling the compressor, on the basis of information regarding the starting and stopping of the operation and the preset temperature set by the remote controller and detection information obtained by the inlet temperature sensor and the human detection sensor,
   wherein the indoor units of the plurality of air conditioners are installed in the same indoor space, and the control units of the air conditioners are connected by wiring or wirelessly,
   wherein each of the control units of the plurality of air conditioners can grasp the detection information of the human detection sensor, preset temperature information of the remote controller, and inlet temperature information of the inlet temperature sensor of the other air conditioners in the same space,
   wherein on the basis of the preset temperature information and inlet temperature information, each of the control units calculates an air-conditioning load of each of the air-conditioning target spaces and an air-conditioning load of an entire air-conditioning space that is a sum of the air-conditioning load of each of the air-conditioning target spaces, the entire air-conditioning space being formed from each of the air-conditioning target spaces and
   wherein, in a case where the calculated air-conditioning loads in both of the entire air-conditioning space and at least part of the plurality of the air-conditioning target spaces have a margin respectively, the control unit of each of the air conditioners controls and drives each compressor to perform a power-saving operation of the entire air-conditioning space by stopping operation of at least one of the air conditioners, making one or more efficient air conditioners having better operation efficiency than the other air conditioners to preferentially operate, or shifting the preset temperature or the inlet temperature of each of the air conditioners to a side where power consumption is made to be smaller than a current value, within the margins of the air-conditioning loads of the air-conditioning target space and the entire air-conditioning space.

2. The air-conditioning system of claim 1, wherein the control unit of each of the air conditioners performs the stopping or shifting for the air conditioner for the air-conditioning target space in which a number of people is smaller than the number in the other air-conditioning target space from the detection information of each of the human detection sensors in the same indoor space.

3. The air-conditioning system of claim 2, wherein, when shifting the preset temperature or inlet temperature to the side where the power consumption of the air conditioner is made to be smaller than the current value, the control unit of each of the air conditioners varies a shift amount of the preset temperature or inlet temperature in accordance with the number of people from the detection information of each of the human detection sensors.

4. The air-conditioning system of claim 1, wherein the control unit of each of the air conditioners controls the power-saving operation that is shifted to the side in which the power consumption of the air conditioner is made to be smaller than the current value to a maximum for the air conditioner for the air-conditioning target space in which no human is detected from the detection information of each of the human detection sensors in the same indoor space and that is performed while keeping a difference between the inlet temperature and the preset temperature within a range for the air conditioner for the air-conditioning target space in which a human is detected from the detection information of each of the human detection sensors in the same indoor space.

5. The air-conditioning system of claim 1, wherein the control unit of each of the air conditioners prohibits all of the air conditioners from simultaneously performing a defrosting operation in the same indoor space, and performs the defrosting operation one by one from the air conditioner in the air-conditioning target space having a smallest calculated air-conditioning load.

6. The air-conditioning system of claim 1, wherein the control unit of each of the air conditioners prohibits all of the plurality of air conditioners from simultaneously performing a defrosting operation in the same indoor space, and performs the defrosting operation one by one from the air conditioner in the air-conditioning target space in which a number of people is smallest from the detection information of the human detection sensor of each of the air conditioners.

7. The air-conditioning system of claim 1, wherein in the indoor unit, a centrifugal fan for sucking inlet air from an inlet opening and a vane for adjusting a flow direction of outlet air to be blown out of an outlet opening are arranged,
and wherein
when there is the air-conditioning target space, in which the calculated air-conditioning load is higher than a load capable of being covered by capacity of the air conditioner for the air-conditioning target space having the higher air-conditioning load, the control unit of the other air conditioner for the other air-conditioning target space drives and controls the vane and centrifugal fan of the other air conditioner in which the control unit is provided to send the outlet air whose direction and volume are adjusted to the air-conditioning target space having the higher air-conditioning load.

8. An air-conditioning system having a plurality of air conditioners: each air conditioner comprising;
   an indoor unit arranged with a human detection sensor for detecting a human motion in an air-conditioning target space and an inlet temperature sensor for detecting an inlet temperature of the indoor unit;
   a compressor controlling an efficiency of heat exchange of a heat exchanger installed in the indoor unit;
   a remote controller for starting and stopping an operation of the air conditioner and setting a preset temperature; and
   a control unit for driving and controlling the compressor, on the basis of information regarding the starting and stopping of the operation and the preset temperature set by the remote controller and detection information obtained by the inlet temperature sensor and the human detection sensor,
   wherein the each of the indoor units of the air conditioners is installed in a same indoor space, and the control units of the air conditioners are connected via wiring or wirelessly in such a manner that one unit serves as a parent device,
   wherein the control unit of the air conditioner serving as the parent device can grasp the detection information of the human detection sensor, the preset temperature information of the remote controller, the inlet temperature information of the inlet temperature sensor of the other air conditioners,
   wherein the control unit of the air conditioner serving as the parent device calculates an air-conditioning load in each of the air-conditioning target spaces and an air-conditioning load in an entire air-conditioning space that is a sum of the air-onditioning load of each of the air-conditioning target spaces, the entire air-conditioning space being formed from each of the air-conditioning target spaces, based on the preset temperature information and inlet temperature information,
   and wherein, in a case where the calculated air-conditioning loads in both of the entire air-conditioning space and at least part of the plurality of the air-conditioning target spaces have a margin respectively, the control unit of the air conditioner of the parent device controls stopping operation of at least one air conditioner of the plurality of the air conditioners, operating preferentially one or more air conditioners having better operation efficiency than the other air conditioners, or shifting the preset temperature or inlet temperature of each of the air conditioners to a side where power consumption is made to be smaller than a current value, within the margins of the air-conditioning loads of the air-conditioning target space and the entire air-conditioning space.

9. The air-conditioning system of claim 8, wherein, when stopping the operation of the air conditioner or shifting the power consumption of the air conditioner to the smaller side than the current value, the control unit of the air conditioner of the parent device outputs a stop signal or a shaft signal to the control unit of the air conditioner for the air-conditioning target space in which a number of people is smaller than the number in the other air-conditioning target space from the detection information of each of the human detection sensors of the same indoor space.

10. The air-conditioning system of claim 9, wherein, when shifting the preset temperature or inlet temperature to the side where the power consumption of the air conditioner is made to be smaller than the current value, the control unit of the air conditioner of the parent device varies a shift amount of the preset temperature or the inlet temperature in accordance with the number of people from the detection information of each of the human detection sensors.

11. The air-conditioning system of claim 8, wherein the control unit of the air conditioner of the parent device performs a control for a power-saving operation that is shifted to a side in which the power consumption of the air conditioner is made to be smaller than the current value to a maximum for the air conditioner for the air-conditioning target space in which no human is detected from the detection information of each of the human detection sensors in the same indoor space and that is performed while keeping it within a range for the air conditioner for the air-conditioning target space in which a human is detected from the detection information of each of the human detection sensors in the same indoor space.

12. The air-conditioning system of claim 8, wherein the control unit of the air conditioner of the parent device prohibits all of the air conditioners from simultaneously performing a defrosting operation in the same indoor space, and outputs a control instruction to the control unit of the corresponding air conditioner to cause the air conditioners to perform the defrosting operation one by one from the air conditioner in the air-conditioning target space in which the calculated air-conditioning load is smallest.

13. The air-conditioning system of claim 8, wherein the control unit of the air conditioner of the parent device prohibits all of the plurality of air conditioners from simultaneously performing a defrosting operation in the same indoor space, and outputs a control instruction to the control unit of the corresponding air conditioner to cause the air conditioners to perform the defrosting operation one by one from the air conditioner in the air-conditioning target space in which the number of people is smallest from the detection information of the human detection sensor of each of the air conditioners.

14. The air-conditioning system of claim 8, wherein in the indoor unit, a centrifugal fan for sucking inlet air from an inlet opening and a vane for adjusting a flow direction of outlet air to be blown out of an outlet opening are arranged,
   and wherein when there is the air-conditioning target space, in which the calculated air-conditioning load is higher than a load capable of being covered by capacity of the air conditioner for the air-conditioning target space having the higher air-conditioning load, the control unit of the air conditioner of the parent device drives and controls the vane and centrifugal fan of the other air conditioner for the other air-conditioning target space to send the outlet air whose direction and volume are adjusted to the air-conditioning target space having the higher air-conditioning load.

15. An air-conditioning system having a plurality of air conditioners: each air conditioner comprising;

an indoor unit arranged with a human detection sensor for detecting a human motion in an air-conditioning target space and an inlet temperature sensor for detecting an inlet temperature of the indoor unit;
a compressor controlling an efficiency of heat exchange of a heat exchanger installed in the indoor unit;
a remote controller for starting and stopping an operation of the air conditioner and setting a preset temperature; and
a control unit for driving and controlling the compressor, on the basis of information on the starting and stopping of the operation of the air conditioner and the preset temperature set by the remote controller and detection information obtained by the inlet temperature sensor and the human detection sensor,
wherein the indoor units of the air conditioners are installed in the same indoor space, and the control units of all of the air conditioners and a control apparatus different from the air conditioners are connected via wiring or wirelessly in such a manner that the control apparatus serves as a host for the air conditioners,
wherein the control apparatus can grasp the detection information of the human detection sensor, information on the preset temperature of the remote controller, information on the inlet temperature of the inlet temperature sensor, of the plurality of air conditioners,
wherein the control apparatus calculates an air-conditioning load in each of the air-conditioning target spaces and an air-conditioning load in an entire air-conditioning space that is the sum of air-conditioning loads of each of the air-conditioning target spaces, the entire air-conditioning space being formed from each of the air-conditioning target spaces, on the basis of the preset temperature information and inlet temperature information
and wherein, in a case where the calculated air-conditioning loads in both of the entire air-conditioning space and at least part of the plurality of the air-conditioning target spaces have a margin respectively, the control apparatus performs stopping operation of at least one of the air conditioners, operating preferentially one or more efficient air conditioners whose operation efficiency is better than the other air conditioners, or shifting the preset temperature or the inlet temperature of each of the air conditioners to a side where power consumption of the air conditioner is smaller than a current value, within the margins of the air-conditioning loads of the air-conditioning target space and the entire air-conditioning space.

16. The air-conditioning system of claim 15, wherein when stopping the operation of the air conditioner or shifting the power consumption of the air conditioner to the smaller side than the current value, the control apparatus outputs a stop signal or a shift signal to the control unit of the air conditioner for the air-conditioning target space in which number of people is smaller than a number in the other air-conditioning target space from the detection information of each of the human detection sensors in the indoor space.

17. The air-conditioning system of claim 16, wherein, when shifting the preset temperature or inlet temperature to the side where the power consumption of the air conditioner is made to be smaller than the current value, the control apparatus varies a shift amount to the power-saving side of the preset temperature or the inlet temperature in accordance with the number of people from the detection information of each of the human detection sensors.

18. The air-conditioning system of claim 15, wherein the control apparatus performs a control for a power-saving operation that is shifted to a side in which the power consumption of the air conditioner is made to be smaller than the current value to a maximum for the air conditioner for the air-conditioning target space in which no human is detected from the detection information of each of the human detection sensors in the same indoor space and that is performed while keeping a difference between the inlet temperature and the preset temperature within a range for the air conditioner for the air-conditioning target space in which a human is detected from the detection information of each of the human detection sensors in the same indoor space.

19. The air-conditioning system of claim 15, wherein the control apparatus prohibits all of the air conditioners from simultaneously performing a defrosting operation in the same indoor space, and outputs a control instruction to the control unit of the corresponding air conditioner to perform the defrosting operation one by one from the air conditioner in the air-conditioning target space in which the calculated air-conditioning load is smallest.

20. The air-conditioning system of claim 15, wherein the control apparatus prohibits all of the plurality of air conditioners from simultaneously performing a defrosting operation in the same indoor space, and outputs a control instruction to the control unit of the corresponding air conditioner to perform the defrosting operation one by one from the air conditioner in the air-conditioning target space in which a number of people is smallest from the detection information of the human detection sensor of each of the air conditioners.

21. The air-conditioning system of claim 15, wherein in the indoor unit, a centrifugal fan for sucking inlet air from an inlet opening and a vane for adjusting a flow direction of outlet air to be blown out of an outlet opening are arranged,
and wherein when there is an air-conditioning target space, in which the calculated air-conditioning load is higher than a load capable of being covered by capacity of the air conditioner for the air-conditioning target space having the higher air-conditioning load, the control apparatus drives and controls the vane and centrifugal fan of the other air conditioner for the other air-conditioning target space to send the outlet air whose direction and volume are adjusted to the air-conditioning target space having the higher air-conditioning load.

* * * * *